United States Patent
Gao et al.

(10) Patent No.: US 12,477,099 B2
(45) Date of Patent: Nov. 18, 2025

(54) VIDEO ENCODING METHOD AND APPARATUS, VIDEO DECODING METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Xinwei Gao, Guangdong (CN); Chenchen Gu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 17/449,375

(22) Filed: Sep. 29, 2021

(65) Prior Publication Data

US 2022/0021872 A1 Jan. 20, 2022

Related U.S. Application Data

(63) Continuation of application No. PCT/CN2020/116706, filed on Sep. 22, 2020.

(30) Foreign Application Priority Data

Sep. 27, 2019 (CN) .......................... 201910927033.3

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11);
(Continued)

(58) Field of Classification Search
CPC .. H04N 19/105; H04N 19/132; H04N 19/137; H04N 19/176; H04N 19/30; H04N 19/513; H04N 19/59; H04N 19/70
(Continued)

(56) References Cited

U.S. PATENT DOCUMENTS

| | | |
|---|---|---|
| 7,956,930 B2 | 6/2011 | Sullivan |
| 8,126,282 B2 | 2/2012 | Jung et al. |

(Continued)

FOREIGN PATENT DOCUMENTS

| | | | | |
|---|---|---|---|---|
| CN | 101366281 A | 2/2009 | | |
| CN | 101366281 B | * 6/2011 | ........... | G06T 3/4007 |

(Continued)

OTHER PUBLICATIONS

Supplementary European Search Report issued Oct. 24, 2022 in Application No. 20868016.5, pp. 1-8.
(Continued)

*Primary Examiner* — Behrooz M Senfi
(74) *Attorney, Agent, or Firm* — ArentFox Schiff LLP

(57) ABSTRACT

A video encoding method and a video decoding method are provided. In the video decoding method, a first resolution of a to-be-decoded block in a to-be-decoded video frame is obtained and a second resolution of a reference block referenced by the to-be-decoded block in a decoded video frame is obtained. Resolutions of the to-be-decoded block and the reference block are adjusted to a target resolution when the first resolution is different from the second resolution. A motion vector (MV) of the to-be-decoded block relative to the reference block is determined according to the to-be-decoded block with the target resolution and the reference block with the target resolution.

15 Claims, 4 Drawing Sheets

(51) Int. Cl.
  *H04N 19/137*  (2014.01)
  *H04N 19/176*  (2014.01)
  *H04N 19/30*   (2014.01)
  *H04N 19/70*   (2014.01)

(52) U.S. Cl.
  CPC ........... *H04N 19/176* (2014.11); *H04N 19/30* (2014.11); *H04N 19/70* (2014.11)

(58) Field of Classification Search
  USPC ................................................ 375/240.02
  See application file for complete search history.

(56) References Cited

U.S. PATENT DOCUMENTS

| | | | | |
|---|---|---|---|---|
| 8,358,701 | B2* | 1/2013 | Chou | H04N 19/172 375/240.25 |
| 8,493,513 | B2 | 7/2013 | Sullivan | |
| 8,780,272 | B2 | 7/2014 | Sullivan | |
| 9,318,729 | B2 | 4/2016 | Sullivan | |
| 10,721,466 | B2 | 7/2020 | Mao et al. | |
| 2006/0233259 | A1* | 10/2006 | Chou | H04N 19/513 375/E7.181 |
| 2007/0160153 | A1 | 7/2007 | Sullivan | |
| 2010/0150231 | A1 | 6/2010 | Huang et al. | |
| 2011/0211122 | A1* | 9/2011 | Sullivan | H04N 21/234354 348/581 |
| 2013/0271651 | A1 | 10/2013 | Sullivan | |
| 2013/0294516 | A1* | 11/2013 | Guduru | H04N 19/53 375/E7.125 |
| 2013/0314496 | A1* | 11/2013 | Rossato | H04N 19/50 375/240.03 |
| 2014/0269912 | A1 | 9/2014 | Sullivan | |
| 2019/0141332 | A1* | 5/2019 | Shoa Hassani Lashdan | H04N 19/59 |
| 2019/0253704 | A1 | 8/2019 | Mao et al. | |
| 2022/0014772 | A1* | 1/2022 | Wan | H04N 19/117 |

FOREIGN PATENT DOCUMENTS

| | | | | | |
|---|---|---|---|---|---|
| CN | 107155107 | A | | 9/2017 | |
| CN | 108768682 | A | | 11/2018 | |
| CN | 108833923 | A | * | 11/2018 | ........... H04N 19/124 |
| CN | 108848380 | A | * | 11/2018 | ........... H04N 19/124 |
| CN | 109618160 | A | * | 4/2019 | ........... H04N 19/139 |
| CN | 110278487 | A | * | 9/2019 | ........... G06K 9/6267 |
| CN | 110572673 | A | | 12/2019 | |
| CN | 110572674 | A | * | 12/2019 | ............. H04N 19/44 |
| EP | 1 401 21142 | | | 3/2004 | |

OTHER PUBLICATIONS

Kiran Misra, et al, JCTVC-G715: Absolute Signaling for Resolution Switching, Sharp Laboratories of America, 6 pgs.

Kiran Misra et al, AHG18/21: Absolute signaling for resolution switching, Joint Collaborative Team on Video Coding (JCT-VC) of ITU-T SG16 WP3 and ISO/IEC JTC1/SC29/WG11. 7th Meeting: Geneva, CH, Nov. 21-30, 2011, Document: JCTVC-G715, , Sharp Labs of America, Inc., 4 pgs.

Kiran Misra et al, AHG18/21: Absolute signaling for resolution switching, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G715, r1, Sharp Labs of America, Inc., 5 pgs.

Kiran Misra et al, AHG18/21: Absolute signaling for resolution switching, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G715, r2, Sharp Labs of America, Inc., 5 pgs.

International Search Report mailed Dec. 21. 2020 Issued in corresponding application PCT/CN2020/116706 (with English translation) 9 pages.

Written Opinion mailed Dec. 21, 2020 issued in corresponding application PCT/CN2020/118706 (4 pages).

Choi et al., "AHG8: Signaling and Filtering for Reference Picture Resampling", Tencent, Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0332, Jul. 2019, 8 pages.

Office Action received for European Patent Application No. 20868016. 5, mailed on Jul. 30, 2025, 11 pages.

Oraintara et al., "Image/video scaling algorithm based on multirate signal processing", Proceedings 1998 International Conference on Image Processing. ICIP98 (Cat. No.98CB36269), XP-001045884, 1998, pp. 732-736.

Wenger et al., "[AHG19] On Signaling of Adaptive Resolution Change", Tencent, Joint Video Experts Team (JVET) of ITU-T SG 16 WP 3 and ISO/IEC JTC 1/SC 29/WG 11 14th Meeting: Geneva, CH, Mar. 19-27, 2019, Document: JVET-N0052, Mar. 2019, 11 pages.

* cited by examiner

VIDEO ENCODING METHOD AND APPARATUS, VIDEO DECODING METHOD AND APPARATUS, STORAGE MEDIUM, AND ELECTRONIC DEVICE

RELATED APPLICATIONS

This application is a continuation of International Application No. PCT/CN2020/116706, entitled "VIDEO ENCODING AND DECODING METHODS AND APPARATUSES, STORAGE MEDIUM, AND ELECTRONIC DEVICE" and filed on Sep. 22, 2020, which claims priority to Chinese Patent Application No. 201910927033.3, entitled "VIDEO ENCODING METHOD AND APPARATUS, VIDEO DECODING METHOD AND APPARATUS, STORAGE MEDIUM, AND ELECTRONIC DEVICE" filed on Sep. 27, 2019. The entire disclosures of the prior applications are hereby incorporated by reference in their entirety.

FIELD OF THE TECHNOLOGY

This application relates to the field of audio and video encoding and decoding, including to a video encoding method and apparatus, a video decoding method and apparatus, a storage medium, and an electronic device.

BACKGROUND OF THE DISCLOSURE

With the development of digital media technologies and computer technologies, videos are applied to various fields such as mobile communication, online surveillance, and online television. With the improvement of hardware performance and screen resolution, users' demand for high-definition videos is increasing.

Under the condition of limited mobile bandwidth, an existing codec usually encodes and decodes a video frame by using the same resolution. As a result, a peak signal to noise ratio (PSNR) in partial bandwidth is relatively low, resulting in distortion of a video frame and causing a problem of poor quality of video playing. In related art, resolutions used for encoding and decoding different video blocks can be adjusted, to reduce distortion of the video frame. However, after the resolutions used for encoding and decoding the video blocks are adjusted, a motion vector (MV) of a decoding block cannot be determined during decoding, resulting in failure to decode properly.

For the foregoing problem, no effective solution has been provided at present.

SUMMARY

A video decoding method is provided. In the video decoding method, a first resolution of a to-be-decoded block in a to-be-decoded video frame is obtained and a second resolution of a reference block referenced by the to-be-decoded block in a decoded video frame is obtained. Resolutions of the to-be-decoded block and the reference block are adjusted to a target resolution when the first resolution is different from the second resolution. A motion vector (MV) of the to-be-decoded block relative to the reference block is determined according to the to-be-decoded block with the target resolution and the reference block with the target resolution A video encoding method is provided. In the video encoding method, obtaining a first resolution of a to-be-encoded block in a to-be-encoded video frame is obtained and a second resolution of a reference block referenced by the to-be-encoded block in an encoded video frame is obtained. Resolutions of the to-be-encoded block and the reference block are adjusted to a target resolution when the first resolution is different from the second resolution. A motion vector (MV) of the to-be-encoded block relative to the reference block is determined according to the to-be-encoded block with the target resolution and the reference block with the target resolution.

A video decoding apparatus and a video coding apparatus are provided. For example, a video processing apparatus including processing circuitry is provided. The processing circuitry is configured to obtain a first resolution of a to-be-processed block in a to-be-processed video frame and a second resolution of a reference block referenced by the to-be-processed block in a processed video frame. The processing circuitry is configured to adjust resolutions of the to-be-processed block and the reference block to a target resolution when the first resolution is different from the second resolution. The processing circuitry is configured to determine a motion vector (MV) of the to-be-processed block relative to the reference block according to the to-be-processed block with the target resolution and the reference block with the target resolution.

One or more non-transitory computer-readable storage mediums are provided. The one or more non-transitory computer-readable storage mediums storing instructions which when executed by one or more processors cause the one or more processors to perform one or more of the decoding and/or encoding methods.

An electronic device includes a memory and one or more processors, the memory storing computer-readable instructions, the computer-readable instructions, when executed by the one or more processors, causing the one or more processors to perform one or more of the decoding and/or encoding methods.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from these accompanying drawings without creative efforts.

DESCRIPTION OF EMBODIMENTS

In order to make a person skilled in the art better understand the solutions of this disclosure, the following describes technical solutions in the embodiments of this disclosure with reference to the accompanying drawings in the embodiments of this disclosure. The described embodiments are only some of the embodiments of this disclosure rather than all of the embodiments. All other embodiments obtained by a person of ordinary skill in the art based on the embodiments of this disclosure fall within the protection scope of this disclosure.

In the specification, claims, and accompanying drawings of this disclosure, the terms "first", "second", and so on are intended to distinguish between similar objects but do not necessarily indicate a specific order or sequence. It is to be understood that the data termed in such a way is interchangeable in proper circumstances, so that the embodiments of this disclosure described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to an aspect of the embodiments of this disclosure, a video decoding method is provided. In some implementations, the video decoding method is applicable to, but is not limited to, an application environment shown in FIG. 1. The application environment includes a terminal 102 and a server 104. The terminal 102 and the server 104 communicate with each other by using a network. The terminal 102 may be, but is not limited to, a smartphone, a tablet computer, a laptop computer, a desktop computer, or the like, but is not limited thereto. The server 104 may be, but is not limited to, a computer processing device having a relatively strong data processing capability and a particular storage space.

Figures 1, 2:
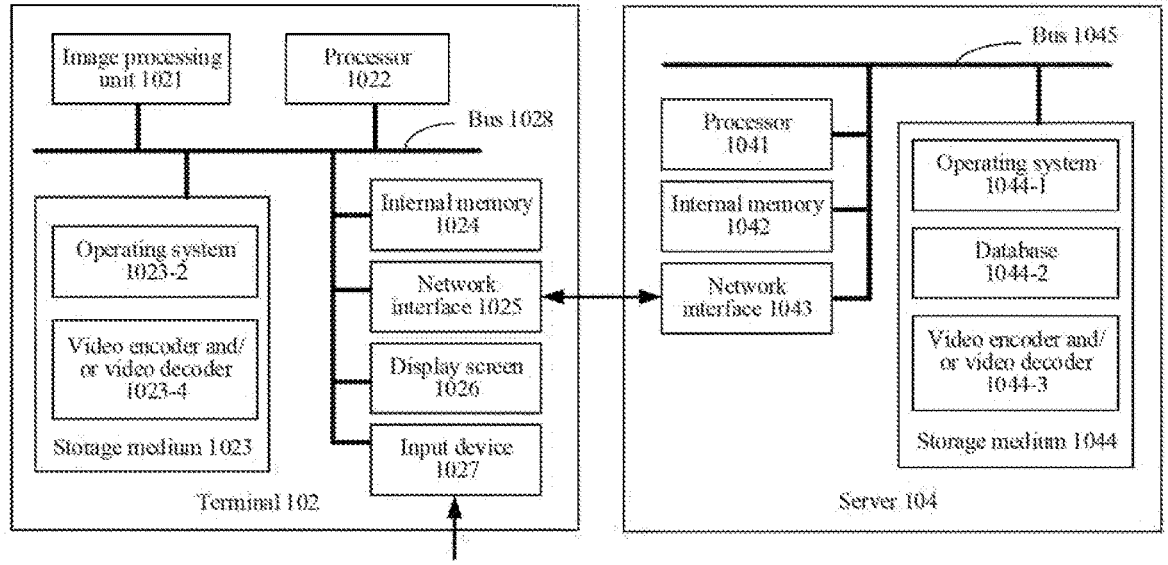
FIG. 1 is a schematic diagram of an application environment of an optional video decoding method according to an embodiment of this disclosure.
FIG. 2 is a flowchart of an optional video decoding method according to an embodiment of this disclosure.

The video encoding method corresponding to the video decoding method is alternatively applicable to, but is not limited to, the application environment shown in FIG. 1. After a to-be-encoded video is obtained, the video encoding method provided in this disclosure may be used, but is not limited thereto. Resolutions of a to-be-encoded block and a reference block are adjusted to a target resolution through an interaction process between the terminal 102 and the server 104 shown in FIG. 1, so that a motion vector (MV) of the to-be-encoded block relative to the reference block is determined, to encode the to-be-encoded video when resolutions of video blocks are different. In addition, after a to-be-decoded video is obtained, the video decoding method provided in this disclosure may be alternatively used, but is not limited thereto. Resolutions of a to-be-decoded block and a reference block are adjusted to a target resolution through an interaction process between the terminal 102 and the server 109 shown in FIG. 1, so that an MV of the to-be-decoded block relative to the reference block is determined, to decode the to-be-decoded video when resolutions of video blocks are different.

In an embodiment, the terminal 102 may include, but is not limited to, the following components: an image processing unit 1021, a processor 1022, a storage medium 1023, an internal memory 1024, a network interface 1025, a display screen 1026, and an input device 1027. The components may be connected by, but is not limited to, a system bus 1028. The image processing unit 1021 is configured to provide at least a drawing capability of a display interface. The processor 1022 is configured to provide computing and control capabilities, to support operation of the terminal 102. An operating system 1023-2 and a video encoder and/or a video decoder 1023-4 are stored in the storage medium 1023. The operating system 1023-2 is configured to provide a control operation instruction, and the video encoder and/or the video decoder 1023-4 is configured to perform an encoding/decoding operation according to the control operation instruction. In addition, the internal memory 1024 provides an operation environment for the video encoder and/or the video decoder 1023-4 in the storage medium 1023. The network interface 1025 is configured to perform network communication with a network interface 1043 in the server 104. The display screen is configured to display an application interface such as a video decoding interface. The input device 1027 is configured to receive a command, data, or the like entered by a user. For the terminal 102 having a touchscreen, the display screen 1026 and the input device 1027 may be the touchscreen. The internal structures of the terminal shown in FIG. 1 are merely exemplary block diagrams of partial structures related to a solution in this disclosure, and do not constitute a limitation to the terminal to which the solution in this disclosure is applied. For example, the terminal or the server may include more components or fewer components than those shown in the figures, or some components may be combined, or a different component configuration may be used.

In an embodiment, the server 104 may include, but is not limited to, the following components: a processor 1041, an internal memory 1042, a network interface 1043, and a storage medium 1044. The components may be connected by, but is not limited to, a system bus 1045. The storage medium 1044 includes an operating system 1044-1, a database 1044-2, and a video encoder and/or a video decoder 1044-3. The processor 1041 is configured to provide computing and control capabilities, to support operation of the server 104. The internal memory 1042 provides an environment for operation of the video encoder and/or the video decoder 1044-3 in the storage medium 1044. The network interface 1043 is configured to connect to and communicate with the network interface 1025 of the external terminal 102 by using a network. The operating system 1044-1 in the storage medium is configured to provide a control operation instruction. The video encoder and/or the video decoder 1044-3 is configured to perform an encoding/decoding operation according to the control operation instruction. The database 1044-2 is configured to store data. The internal structures of the server shown in FIG. 1 are merely exemplary block diagrams of partial structures related to a solution in this disclosure, and do not constitute a limitation to a computer device to which the solution in this disclosure is applied. For example, the computer device has different component configurations.

In an embodiment, the network may include, but is not limited to, a wired network. The wired network may include, but is not limited to: a wide area network, a metropolitan area network, and a local area network. The foregoing is merely an example, and this is not limited in this embodiment.

According to an aspect of the embodiments of this disclosure, a video decoding method is provided. As shown in FIG. 2, the method can include the following steps.

In step S202, a first resolution used for decoding a to-be-decoded block in a to-be-decoded video frame and a second resolution used for decoding a reference block are obtained, the reference block being a reference block to which the to-be-decoded block refers in a decoded video frame.

In step S204, resolutions of the to-be-decoded block and the reference block are adjusted to a target resolution when the first resolution is different from the second resolution.

In step S206, an MV of the to-be-decoded block relative to the reference block is determined according to the to-be-decoded block with the target resolution and the reference block with the target resolution.

The video decoding method shown in FIG. 2 is applicable to, but is not limited to, the video decoder shown in FIG. 1. A decoding process of the to-be-decoded video frame is completed through interaction and cooperation between the video decoder and another component.

In some embodiments, the video decoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (e.g., the playing time is greater than 10 minutes) or a picture presented in a long video session, and the short video may be a voice message exchanged between two or more parties or a video with a relatively short playing time (e.g., the playing time is less than or equal to 30 seconds) presented on a sharing platform. The foregoing is merely an example. The video decoding method provided in this embodiment is applicable to, but is not limited to, a playback device configured to play a video in the application scenario. After an encoded bitstream data is obtained, MVs are determined for to-be-decoded blocks in to-be-decoded-video frames for decoding, thereby avoiding that the MV cannot be determined due to different resolutions of the to-be-decoded block and the reference block.

When a video is encoded, different video blocks in video frames may be encoded by using different resolutions, thereby overcoming a problem of distortion caused by the use of a uniform resolution in the related art and ensuring the quality of video play back. In this embodiment, during decoding of a video, when a resolution of a to-be-decoded block is different from a resolution of a reference block, both the resolutions of the to-be-decoded block and the reference block are adjusted to a target resolution, so that an MV of the to-be-decoded block relative to the reference block may be determined in the target resolution, and a technical effect of determining the MV when different resolutions of video blocks is achieved, thereby resolving a technical problem that the MV cannot be determined due to the different resolutions of the video blocks. It may be understood that the MV of the to-be-decoded block relative to the reference block determined in the target resolution herein may be used as an MV of the to-be-decoded block. In this embodiment of this disclosure, during decoding, for determining the MV of the to-be-decoded block relative to the reference block, the resolutions of the to-be-decoded block and the reference block need to be adjusted. Herein, resolutions of a reconstruction block of the to-be-decoded block and a reconstruction block of the reference block may be adjusted, so that the MV of the to-be-decoded block relative to the reference block may be determined without actually changing the original to-be-decoded block and the original reference block. This is also applicable to an encoding process.

In some embodiments, after a to-be-decoded video frame in a to-be-decoded video is determined from a bitstream received by an decoding device and before the to-be-decoded video frame is decoded, a reference video frame may be determined from, but is not limited to, video frames that have been decoded before the to-be-decoded video frame, and a reference block in the reference video frame is further determined. In this embodiment of this disclosure, a decoding mode of the reference video frame may be determined by obtaining a flag bit preset in a bitstream, and determining, according to the flag bit, a decoding manner such as intra-frame decoding or inter-frame decoding used by the reference video frame; and performing decoding according to an agreement with an encoding device on an encoder side, and determining a decoding manner such as intra-frame decoding or inter-frame decoding used by the reference video frame that has been decoded after being decoded.

Figure 3:
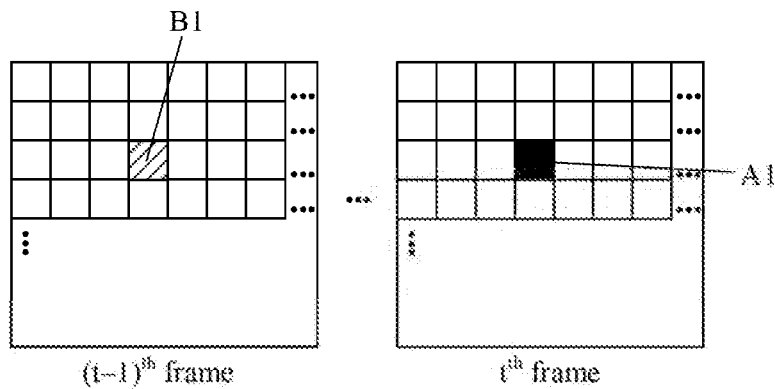
FIG. 3 is a schematic diagram of an optional video decoding method according to an embodiment of this disclosure.
Figure 4:
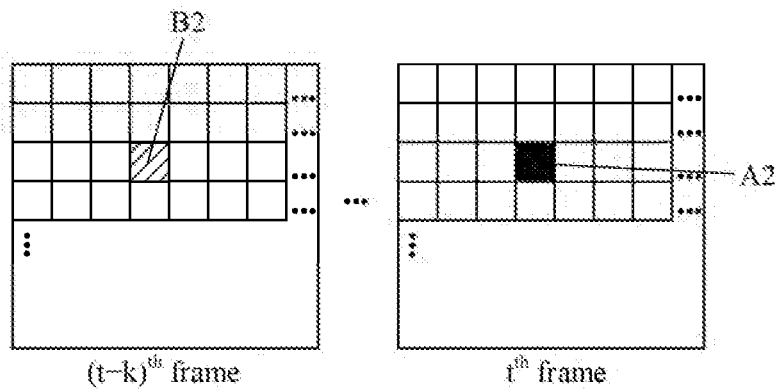
FIG. 4 is a schematic diagram of another optional video decoding method according to an embodiment of this disclosure.

For the reference block in this embodiment of this disclosure, as shown in FIG. 3, a frame is a current to-be-decoded video frame, a video block A1 is a current to-be-decoded block, and a video block B1 in a previous frame of the to-be-decoded video frame is a reference block of the to-be-decoded block A1. That is, the reference block in this embodiment of this disclosure may be a corresponding reference video block in the previous frame of the to-be-decoded video frame in which the to-be-decoded block is located. It may be understood that the reference block herein is not limited to a previous frame of a current frame. As shown in FIG. 4, a $t^{th}$ frame is a current to-be-decoded video frame, a $(t-k)^{th}$ frame is a reference frame of the $t^{th}$ frame, and a reference block of a to-be-decoded block A2 may be a video block B2 in the $(t-k)^{th}$ frame. That is, the reference block in this embodiment of this disclosure may be a reference video block in the reference video frame and before the to-be-decoded block. It may be understood that the $(t-k)^{th}$ frame herein may be first N frames before the $t^{th}$ frame, N being a positive integer. Further, it may be understood that the $(t-k)^{th}$ frame herein may be alternatively a virtual frame obtained by synthesizing a plurality of video frames before a video frame in which the current to-be-decoded block is located. It may be understood that the determining of the reference block is only an exemplary embodiment provided in this disclosure, and is not limited in this disclosure.

In one embodiment, the adjusting resolutions of the to-be-decoded block and the reference block to a target resolution includes: adjusting the first resolution used for decoding the to-be-decoded block to a third resolution, to obtain a first to-be-decoded block, and adjusting the second resolution used for decoding the reference block to the third resolution, to obtain a first reference block, the third resolution being different from the first resolution and the second resolution, and the target resolution being the third resolution; and the determining an MV of the to-be-decoded block relative to the reference block according to the to-be-decoded block with the target resolution and the reference block with the target resolution includes: determining the MV of the to-be-decoded block relative to the reference block according to the first to-be-decoded block and the first reference block.

The third resolution herein may be an original resolution of the to-be-decoded block, or the third resolution is a highest resolution in a predetermined resolution set. It may be understood that a video may have a plurality of resolutions such as existing 720P and 1080P, and the optional resolutions constitute the resolution set herein. Resolutions in the resolution set may meet, but is not limited to, an existing video resolution specification. The original resolution herein is an original resolution of a to-be-decoded video. It may be understood that the original resolution may be the same as or different from the first resolution of the to-be-decoded block.

When the third resolution is lower than a highest resolution in a predetermined resolution set, the adjusting the first resolution used for decoding the to-be-decoded block to a third resolution, to obtain a first to-be-decoded block includes: upsampling the first resolution used for decoding the to-be-decoded block to the highest resolution, to obtain a second to-be-decoded block; and downsampling a resolution of the second to-be-decoded block from the highest resolution to the third resolution, to obtain the first to-be-decoded block; and the adjusting the second resolution used for decoding the reference block to the third resolution, to obtain a first reference block includes: upsampling the second resolution used for decoding the reference block to the highest resolution, to obtain a second reference block; and downsampling a resolution of the second reference block from the highest resolution to the third resolution, to obtain the first reference block. In this embodiment of this disclosure, when the third resolution is lower than the highest resolution in the resolution set, upsampling may be first performed to the highest resolution, and then downsampling is performed to the third resolution.

In one embodiment, before the adjusting the first resolution used for decoding the to-be-decoded block to a third resolution, to obtain a first to-be-decoded block, and adjusting the second resolution used for decoding the reference block to the third resolution, to obtain a first reference block, the method further includes: obtaining a syntax element carried in to-be-decoded data corresponding to the to-be-decoded block, the syntax element being used for indicating the third resolution. In this embodiment of this disclosure, the syntax element herein may be identification information and therefore indicates the third resolution required for decoding.

It may be understood that the third resolution may be alternatively agreed in advance or otherwise predetermined, so that there is no need to carry the syntax element in a bitstream. The MV of the to-be-decoded block relative to the reference block is directly determined according to the predetermined third resolution during decoding. In an embodiment of this disclosure, the syntax element may be an index identifier aligned to an inter-prediction adaptive resolution, which may be specifically recorded as 0, 1, 2, 3, 4, or the like. Each index represents a ratio of resolution scaling of the third resolution. For example, a threshold 0 represents a highest resolution ratio, 1 represents that 3/4 sampling is performed on a width and a height for decoding, 2 represents that 2/3 sampling is performed on the width and the height, 3 represents that 1/2 sampling is performed on the width and the height for decoding; 4 represents that 113 sampling is performed on the width and the height; and 5 represents that 1/4 sampling is performed on the width and the height for decoding. It may be understood that this is only an exemplary embodiment provided in this disclosure, and is not limited thereto in this disclosure.

In an embodiment, the adjusting resolutions of the to-be-decoded block and the reference block to a target resolution includes: adjusting the second resolution used for decoding the reference block to the first resolution, to obtain a third reference block, the target resolution being the first resolution; and the determining an MV of the to-be-decoded block relative to the reference block according to the to-be-decoded block with the target resolution and the reference block with the target resolution includes: determining the MV of the to-be-decoded block relative to the reference block according to the to-be-decoded block and the third reference block. Herein, it may be determined, according to an agreement preset in an encoding and decoding protocol, that the resolution of the reference block is adjusted to be the same as the resolution of the to-be-decoded block, so that the resolution of the to-be-decoded block is not required to be adjusted. The syntax element may be alternatively carried in the bitstream, and the resolution of the reference block is adjusted to the first resolution or the resolution of the reference block is adjusted to be the same as the resolution of the to-be-decoded block through indication of the syntax element.

In an embodiment, the adjusting resolutions of the to-be-decoded block and the reference block to a target resolution includes: adjusting the first resolution used for decoding the to-be-decoded block to the second resolution, to obtain a third to-be-decoded block, the target resolution being the second resolution; and the determining an MV of the to-be-decoded block relative to the reference block according to the to-be-decoded block with the target resolution and the reference block with the target resolution includes: determining the MV of the to-be-decoded block relative to the reference block according to the third to-be-decoded block and the reference block. Herein, it may be determined, according to a predetermined preset in an encoding and decoding protocol, that the resolution of the to-be-decoded block is adjusted to be the same as the resolution of the reference block, so that the resolution of the reference block is not required to be adjusted. The syntax element may be alternatively carried in the bitstream, and the resolution of the to-be-decoded block is adjusted to the second resolution or the resolution of the to-be-decoded block is adjusted to be the same as the resolution of the reference block through indication of the syntax element.

Figure 5:
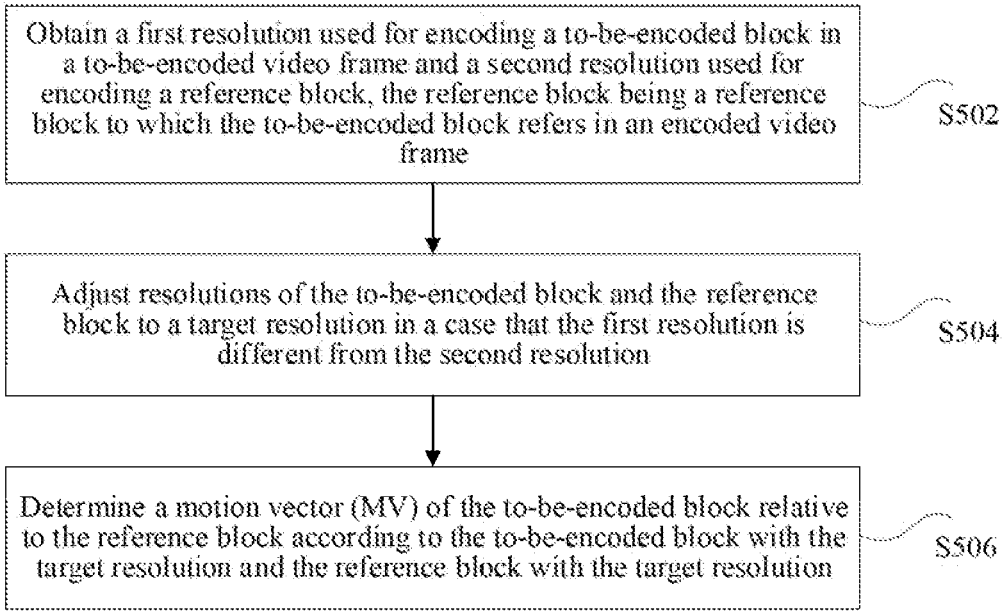
FIG. 5 is a flowchart of an optional video encoding method according to an embodiment of this disclosure.

According to another aspect of the embodiments of this disclosure, a video encoding method is provided. As shown in FIG. 5, the method can include the following steps.

In step S502, a first resolution used for encoding a to-be-encoded block in a to-be-encoded video frame and a second resolution used for encoding a reference block are obtained, the reference block being a reference block to which the to-be-encoded block refers in an encoded video frame.

In step S504, resolutions of the to-be-encoded block and the reference block are adjusted to a target resolution when the first resolution is different from the second resolution.

In step S506, an MV of the to-be-encoded block relative to the reference block is determined according to the to-be-encoded block with the target resolution and the reference block with the target resolution.

The video encoding method shown in FIG. 5 is applicable to, but is not limited to, the video encoder shown in FIG. 1. An encoding process of the to-be-encoded video frame is completed through interaction and cooperation between the video encoder and another component.

In some embodiments, the video encoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (e.g., the playing time is greater than 10 minutes) or a picture presented in a long video session, and the short video may be a voice message exchanged between two or more parties or a video with a relatively short playing time (e.g., the playing time is less than or equal to 30 seconds) presented on a sharing platform. The foregoing is merely an example. The video encoding method provided in this embodiment is applicable to, but is not limited to, a playback device configured to play a video in the application scenario. After a to-be-encoded video is obtained, MVs are determined for to-be-encoded blocks in to-be-encoded video frames for decoding, thereby avoiding that the MV cannot be determined due to different resolutions of the to-be-encoded block and the reference block.

When a video is encoded, different video blocks in video frames may be encoded by using different resolutions, thereby overcoming a problem of distortion caused by the use of a uniform resolution in the related art and ensuring the quality of video playing. In this embodiment, during encoding of a video, when a resolution of a to-be-encoded block is different from a resolution of a reference block, the resolutions of the to-be-encoded block and the reference block are adjusted to a target resolution, so that an MV of the to-be-encoded block relative to the reference block may be determined in the target resolution, and a technical effect of determining the MV when different resolutions of video blocks is achieved, thereby resolving a technical problem that the MV cannot be determined due to the different resolutions of the video blocks. It may be understood that the MV of the to-be-encoded block relative to the reference block determined in the target resolution herein may be used as an MV of the to-be-encoded block. In this embodiment of this disclosure, during encoding, for determining the MV of the to-be-encoded block relative to the reference block, the resolutions of the to-be-encoded block and the reference block need to be adjusted. Herein, resolutions of a reconstruction block of the to-be-encoded block and a reconstruction block of the reference block may be adjusted, so that the MV of the to-be-encoded block relative to the reference block may be determined without actually changing the original to-be-encoded block and the original reference block.

In an embodiment, the adjusting resolutions of the to-be-encoded block and the reference block to a target resolution includes: adjusting the first resolution used for encoding the to-be-encoded block to a third resolution, to obtain a first to-be-encoded block, and adjusting the second resolution used for encoding the reference block to the third resolution, to obtain a first reference block, the third resolution being different from the first resolution and the second resolution, and the target resolution being the third resolution; and the determining an MV of the to-be-encoded block relative to the reference block according to the to-be-encoded block with the target resolution and the reference block with the target resolution includes: determining the MV of the to-be-encoded block relative to the reference block according to the first to-be-encoded block and the first reference block.

In an embodiment, before the adjusting the first resolution used for encoding the to-be-encoded block to a third resolution, to obtain a first to-be-encoded block, and adjusting the second resolution used for encoding the reference block to the third resolution, to obtain a first reference block, the method further includes: obtaining a syntax element carried in to-be-encoded data corresponding to the to-be-encoded block, the syntax element being used for indicating the third resolution. In this embodiment of this disclosure, the syntax element herein may be identification information and therefore indicates the third resolution required for encoding.

It may be understood that the third resolution may be alternatively agreed in advance or otherwise predetermined, so that there is no need to carry the syntax element in a bitstream. The MV of the to-be-encoded block relative to the reference block is directly determined according to the predetermined third resolution during encoding. In an exemplary embodiment of this disclosure, the syntax element may be an index identifier aligned to an inter-prediction adaptive resolution, which may be specifically recorded as 0, 1, 2, 3, 4, or the like. Each index represents a ratio of resolution scaling of the third resolution. For example, a threshold 0 represents a highest resolution ratio, 1 represents that 3/4 sampling is performed on a width and a height for encoding, 2 represents that 2/3 sampling is performed on the width and the height, 3 represents that 1/2 sampling is performed on the width and the height for encoding; 4 represents that 1/3 sampling is performed on the width and the height; and 5 represents that 114 sampling is performed on the width and the height for encoding. It may be understood that this is only an exemplary embodiment provided in this disclosure, and is not limited thereto in this disclosure. It may be understood that the identifier herein is applicable to encoding and decoding.

In an embodiment, the third resolution is an original resolution of the to-be-encoded block, or the third resolution is a highest resolution in a predetermined resolution set. It may be understood that a video may have a plurality of resolutions such as existing 720P and 1080P, and the optional resolutions constitute the resolution set herein. Resolutions in the resolution set may meet, but is not limited to, an existing video resolution specification. The original resolution herein is an original resolution of a to-be-encoded video. It may be understood that the original resolution may be the same as or different from the first resolution of the to-be-encoded block.

In an embodiment, when the third resolution is lower than a highest resolution in a predetermined resolution set, the adjusting the first resolution used for encoding the to-be-encoded block to a third resolution, to obtain a first to-be-encoded block includes: upsampling the first resolution used for encoding the to-be-encoded block to the highest resolution, to obtain a third to-be-encoded block; and downsampling a resolution of the third to-be-encoded block from the highest resolution to the third resolution, to obtain the first to-be-encoded block; and the adjusting the second resolution used for encoding the reference block to the third resolution, to obtain a first reference block includes: upsampling the second resolution used for encoding the reference block to the highest resolution, to obtain a third reference block; and downsampling a resolution of the third reference block from the highest resolution to the third resolution, to obtain the first reference block.

In an embodiment, the adjusting resolutions of the to-be-encoded block and the reference block to a target resolution includes: adjusting the second resolution used for encoding the reference block to the first resolution, to obtain a second reference block, the target resolution being the first resolution; and the determining an MV of the to-be-encoded block relative to the reference block according to the to-be-encoded block with the target resolution and the reference block with the target resolution includes: determining the MV of the to-be-encoded block relative to the reference block according to the to-be-encoded block and the second reference block. Herein, it may be determined, according to a predetermined preset in an encoding and decoding protocol, that the resolution of the reference block is adjusted to be the same as the resolution of the to-be-encoded block, so that the resolution of the to-be-encoded block is not required to be adjusted. The syntax element may be alternatively carried in the bitstream, and the resolution of the reference block is adjusted to the first resolution or the resolution of the reference block is adjusted to be the same as the resolution of the to-be-encoded block through indication of the syntax element.

In an embodiment, the adjusting resolutions of the to-be-encoded block and the reference block to a target resolution includes: adjusting the first resolution used for encoding the to-be-encoded block to the second resolution, to obtain a second to-be-encoded block, the target resolution being the second resolution; and the determining an MV of the to-be-encoded block relative to the reference block according to the to-be-encoded block with the target resolution and the reference block with the target resolution includes: determining the MV of the to-be-encoded block relative to the reference block according to the second to-be-encoded block and the reference block. Herein, it may be determined, according to a predetermined preset in an encoding and decoding protocol, that the resolution of the to-be-encoded block is adjusted to be the same as the resolution of the reference block, so that the resolution of the reference block is not required to be adjusted. The syntax element may be alternatively carried in the bitstream, and the resolution of the to-be-encoded block is adjusted to the second resolution or the resolution of the to-be-encoded block is adjusted to be the same as the resolution of the reference block through indication of the syntax element.

In this embodiment, for exemplary embodiments of the video encoding method, reference may be made to, but is not limited to, the exemplary embodiments of the video decoding method. MVs of to-be-encoded blocks are determined, to encode the to-be-encoded blocks. In this embodiment, details are not described herein again.

For case of description, the foregoing method embodiments are stated as a combination of a series of actions. However, a person skilled in the art should understand that this disclosure is not limited to the described action sequence, because according to this disclosure, some steps may be performed in another sequence or simultaneously. In addition, a person skilled in the art is also to understand that the embodiments described in this disclosure are all exemplary embodiments, and the involved actions and modules are not necessarily required by this disclosure.

Figure 6:
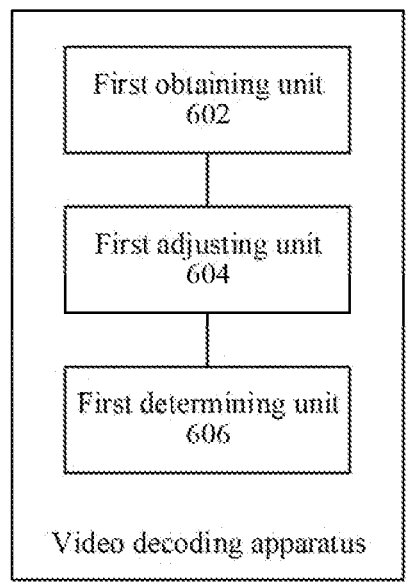
FIG. 6 is a schematic structural diagram of an optional video decoding apparatus according to an embodiment of this disclosure.

According to still another aspect of the embodiments of this disclosure, a video decoding apparatus for implementing the video decoding method is further provided. As shown in FIG. 6, the apparatus can include a first obtaining unit 602, a first adjusting unit 604, and a first determining unit 606. One or more modules, submodules, and/or units of the apparatus can be implemented by processing circuitry, software, or a combination thereof, for example.

The first obtaining unit 602 is configured to obtain a first resolution used for decoding a to-be-decoded block in a to-be-decoded video frame and a second resolution used for decoding a reference block, the reference block being a reference block to which the to-be-decoded block refers in a decoded video frame.

The first adjusting unit 604 is configured to adjust resolutions of the to-be-decoded block and the reference block to a target resolution when the first resolution is different from the second resolution.

The first determining unit 606 is configured to determine an MV of the to-be-decoded block relative to the reference block according to the to-be-decoded block with the target resolution and the reference block with the target resolution.

For exemplary embodiments, reference may be made to the example shown in the foregoing video decoding method, and details are not described herein again in this example.

In an embodiment, the first adjusting unit 604 includes: a first adjusting module, configured to adjust the first resolution used for decoding the to-be-decoded block to a third resolution, to obtain a first to-be-decoded block, and adjust the second resolution used for decoding the reference block to the third resolution, to obtain a first reference block, the third resolution being different from the first resolution and the second resolution, and the target resolution being the third resolution; and the first determining unit 606 includes: a first determining module, configured to determine the MV of the to-be-decoded block relative to the reference block according to the first to-be-decoded block and the first reference block.

For exemplary embodiments, reference may be made to the example shown in the foregoing video decoding method, and details are not described herein again in this example.

In an embodiment, the apparatus may further include a second obtaining unit, configured to obtain a syntax element carried in to-be-decoded data corresponding to the to-be-decoded block before the first resolution used for decoding the to-be-decoded block is adjusted to the third resolution, to obtain the first to-be-decoded block, and the second resolution used for decoding the reference block is adjusted to the third resolution, to obtain the first reference block, the syntax element being used for indicating the third resolution.

For exemplary embodiments, reference may be made to the example shown in the foregoing video decoding method, and details are not described herein again in this example.

In an embodiment, the third resolution is an original resolution of the to-be-decoded block, or the third resolution is a highest resolution in a predetermined resolution set.

For exemplary embodiments, reference may be made to the example shown in the foregoing video decoding method, and details are not described herein again in this example.

In an embodiment, when the third resolution is lower than a highest resolution in a predetermined resolution set, the first adjusting module is further configured to up sample the first resolution used for decoding the to-be-decoded block to the highest resolution, to obtain a second to-be-decoded block; and downsample a resolution of the second to-be-decoded block from the highest resolution to the third resolution, to obtain the first to-be-decoded block; and the first adjusting module is further configured to upsample the second resolution used for decoding the reference block to the highest resolution, to obtain a second reference block; and downsample a resolution of the second reference block from the highest resolution to the third resolution, to obtain the first reference block.

For exemplary embodiments, reference may be made to the example shown in the foregoing video decoding method, and details are not described herein again in this example.

In an embodiment, the first adjusting unit 604 includes: a second adjusting module, configured to adjust the second resolution used for decoding the reference block to the first resolution, to obtain a third reference block, the target resolution being the first resolution; and The first determining unit 606 includes: a second determining module, configured to determine the MV of the to-be-decoded block relative to the reference block according to the to-be-decoded block and the third reference block.

For exemplary embodiments, reference may be made to the example shown in the foregoing video decoding method, and details are not described herein again in this example.

In an embodiment, the first adjusting unit 604 includes: a third adjusting module, configured to adjust the first resolution used for decoding the to-be-decoded block to the second resolution, to obtain a third to-be-decoded block, the target resolution being second resolution; and the first determining unit 606 includes: a third determining module, configured to determine the MV of the to-be-decoded block relative to the reference block according to the third to-be-decoded block and the reference block.

For exemplary embodiments, reference may be made to the example shown in the foregoing video decoding method, and details are not described herein again in this example.

Figure 7:
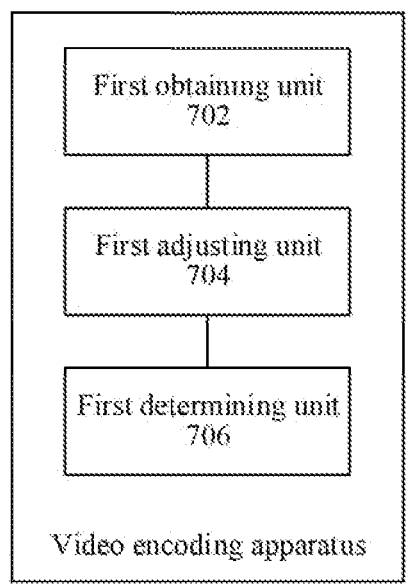
FIG. 7 is a schematic structural diagram of an optional video encoding apparatus according to an embodiment of this disclosure.

According to still another aspect of the embodiments of this disclosure, a video encoding apparatus is further provided. As shown in FIG. 7, the apparatus includes a first obtaining unit 702, a first adjusting unit 704, and a first determining unit 706. One or more modules, submodules, and/or units of the apparatus can be implemented by processing circuitry, software, or a combination thereof, for example.

The first obtaining unit 702 is configured to obtain a first resolution used for encoding a to-be-encoded block in a to-be-encoded video frame and a second resolution used for encoding a reference block, the reference block being a reference block to which the to-be-encoded block refers in an encoded video frame.

The first adjusting unit 704 is configured to adjust resolutions of the to-be-encoded block and the reference block to a target resolution when the first resolution is different from the second resolution.

The first determining unit 706 is configured to determine an MV of the to-be-encoded block relative to the reference block according to the to-be-encoded block with the target resolution and the reference block with the target resolution.

For exemplary embodiments, reference may be made to the example shown in the foregoing video encoding method, and details are not described herein again in this example.

In an embodiment, the first adjusting unit 704 includes: a first adjusting module, configured to adjust the first resolution used for encoding the to-be-encoded block to a third resolution, to obtain a first to-be-encoded block, and adjust the second resolution used for encoding the reference block to the third resolution, to obtain a first reference block, the third resolution being different from the first resolution and the second resolution, and the target resolution being the third resolution; and the first determining unit 706 includes: a first determining module, configured to determine the MV of the to-be-encoded block relative to the reference block according to the first to-be-encoded block and the first reference block.

For exemplary embodiments, reference may be made to the example shown in the foregoing video encoding method, and details are not described herein again in this example.

In an embodiment, the apparatus may further include a second obtaining unit, configured to obtain a syntax element carried in to-be-encoded data corresponding to the to-be-encoded block before the first resolution used for encoding the to-be-encoded block is adjusted to the third resolution, to obtain the first to-be-encoded block, and the second resolution used for encoding the reference block is adjusted to the third resolution, to obtain the first reference block, the syntax element being used for indicating the third resolution.

For exemplary embodiments, reference may be made to the example shown in the foregoing video encoding method, and details are not described herein again in this example.

In an embodiment, the third resolution is an original resolution of the to-be-encoded block, or the third resolution is a highest resolution in a predetermined resolution set.

For exemplary embodiments, reference may be made to the example shown in the foregoing video encoding method, and details are not described herein again in this example.

In an embodiment, when the third resolution is lower than a highest resolution in a predetermined resolution set, the first adjusting module is further configured to upsample the first resolution used for encoding the to-be-encoded block to the highest resolution, to obtain a third to-be-encoded block; and downsample a resolution of the third to-be-encoded block from the highest resolution to the third resolution, to obtain the first to-be-encoded block; and the first adjusting module is further configured to upsample the second resolution used for encoding the reference block to the highest resolution, to obtain a third reference block; and downsample a resolution of the third reference block from the highest resolution to the third resolution, to obtain the first reference block.

For exemplary embodiments, reference may be made to the example shown in the foregoing video encoding method, and details are not described herein again in this example.

In an embodiment, the first adjusting unit 704 includes: a second adjusting module, configured to adjust the second resolution used for encoding the reference block to the first resolution, to obtain a second reference block, the target resolution being the first resolution; and the first determining unit 706 includes: a second determining module, configured to determine the MV of the to-be-encoded block relative to the reference block according to the to-be-encoded block and the second reference block.

For exemplary embodiments, reference may be made to the example shown in the foregoing video encoding method, and details are not described herein again in this example.

In an embodiment, the first adjusting unit 704 includes: a third adjusting module, configured to adjust the first resolution used for encoding the to-be-encoded block to the second resolution, to obtain a second to-be-encoded block, the target resolution being second resolution; and the first determining unit 706 includes: a third determining module, configured to determine the MV of the to-be-encoded block relative to the reference block according to the second to-be-encoded block and the reference block.

For exemplary embodiments, reference may be made to the example shown in the foregoing video encoding method, and details are not described herein again in this example.

Figure 8:
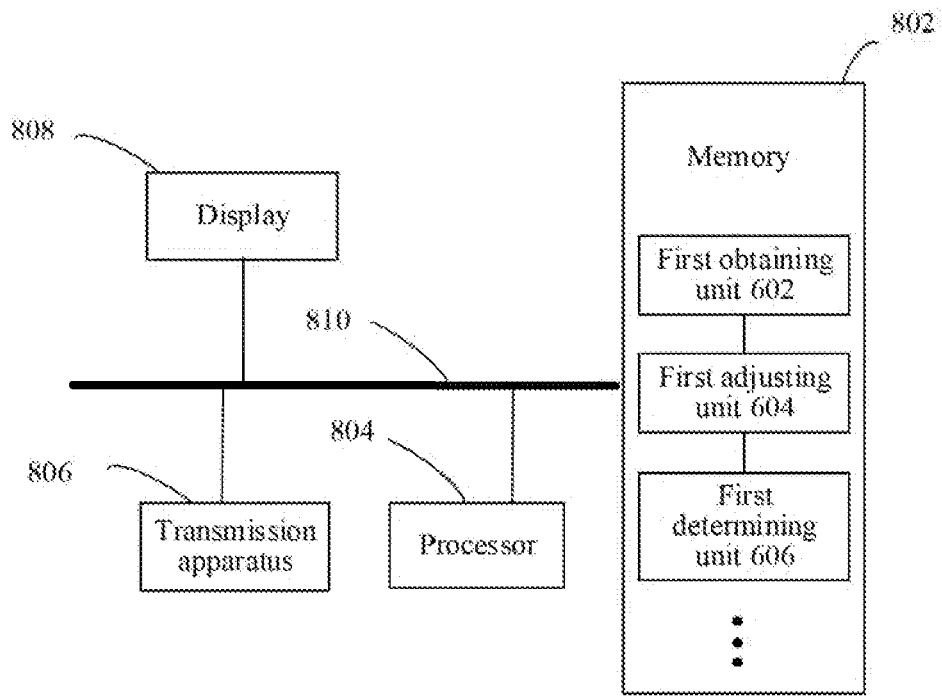
FIG. 8 is a schematic structural diagram of an optional electronic device according to an embodiment of this disclosure.

According to still another aspect of the embodiments of this disclosure, an electronic device configured to implement the foregoing video decoding method is further provided. As shown in FIG. 8, the electronic device includes a memory 802 and a processor 804, the memory storing computer-readable instructions, and the processor being configured to perform steps according to any one of the foregoing method embodiments by using the computer-readable instructions.

In an embodiment, the electronic device may be located in at least one of a plurality of network devices in a computer network.

In an embodiment, the processor may be configured to perform the following steps by executing the computer-readable instructions: obtaining a first resolution used for decoding a to-be-decoded block in a to-be-decoded video frame and a second resolution used for decoding a reference block, the reference block being a reference block to which the to-be-decoded block refers in a decoded video frame; adjusting resolutions of the to-be-decoded block and the reference block to a target resolution when the first resolution is different from the second resolution; and determining an MV of the to-be-decoded block relative to the reference block according to the to-be-decoded block with the target resolution and the reference block with the target resolution.

A person of ordinary skill in the art may understand that, the structure shown in FIG. 8 is only exemplary. The electronic device may be a terminal device such as a smartphone (e.g., an Android mobile phone or an iOS mobile phone), a tablet computer, a palmtop computer, a mobile internet device (MID), or a PAD. FIG. 8 does not limit the structure of the electronic device. For example, the electronic device may further include more or fewer components (e.g., a network interface) than those shown in FIG. 8, or have a configuration different from that shown in FIG. 8.

The memory 802 may be configured to store computer-readable instructions and modules, for example, computer-readable instructions/modules corresponding to the video decoding method and apparatus in the embodiments of this disclosure, and the processor 804 performs various functional applications and data processing by running the software computer-readable instructions and modules stored in the memory 802, that is, implementing the foregoing video decoding method. The memory 802 may include a non-transitory computer-readable storage medium such as a high-speed random access memory, and may also include a non-volatile memory, for example, one or more magnetic storage apparatuses, a flash memory, or another non-volatile solid-state memory. In some embodiments, the memory 802 may further include memories remotely disposed relative to the processor 804, and the remote memories may be connected to a terminal through a network. Examples of the network include, but are not limited to, the Internet, an intranet, a local area network, a mobile communication network, and a combination thereof. The memory 802 may be specifically configured to, but is not limited to, store information such as a to-be-decoded block. As an example, as shown in FIG. 8, the memory 802 may include, but is not limited to, the first obtaining unit 602, the first adjusting unit 604, and the first determining unit 606 in the foregoing video decoding apparatus. In addition, the memory may further include, but is not limited to, other modules and units in the foregoing video decoding apparatus. Details are not described in this example again.

In an embodiment, the transmission apparatus 806 is configured to receive or transmit data through a network. Specific examples of the foregoing network may include a wired network and a wireless network. In an example, the transmission apparatus 806 includes a network interface controller (NIC). The NIC may be connected to another network device and a router by using a network cable, so as to communicate with the Internet or a local area network. In an example, the transmission apparatus 806 is a radio frequency (RF) module, which communicates with the Internet in a wireless manner.

In addition, the electronic device further includes: a display 808, configured to display a decoded video; and a connection bus 810, configured to connect various module components in the electronic device.

Figure 9:
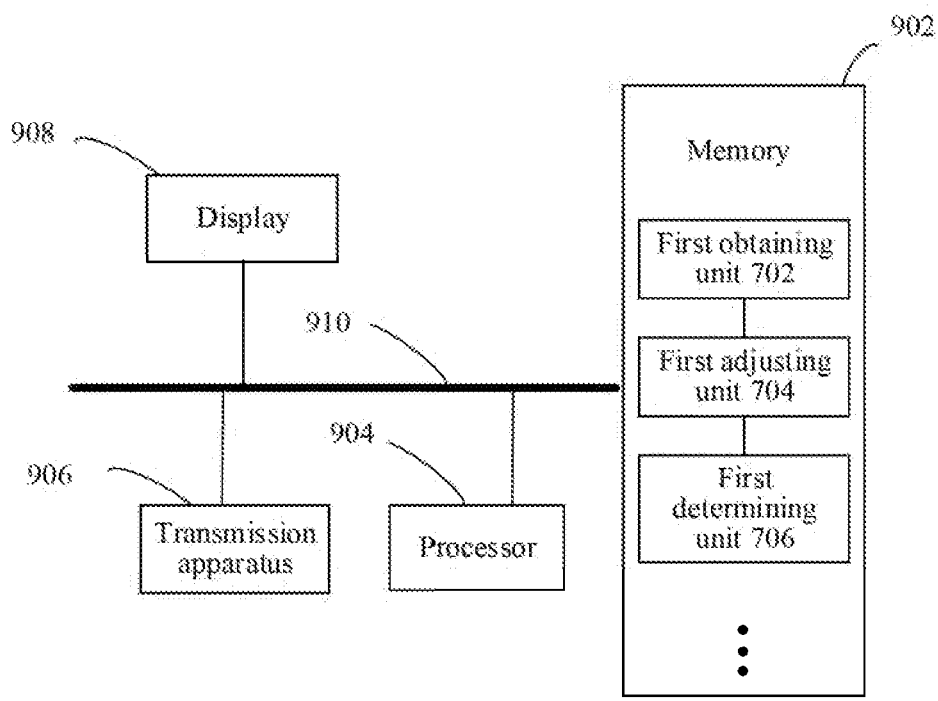
FIG. 9 is a schematic structural diagram of another optional electronic device according to an embodiment of this disclosure.

According to still another aspect of the embodiments of this disclosure, an electronic device configured to implement the foregoing video encoding method is further provided. As shown in FIG. 9, the electronic device includes a memory 902 and a processor 904, the memory 902 storing computer-readable instructions, and the processor 904 being configured to perform steps according to any one of the foregoing method embodiments by using the computer-readable instructions.

In an embodiment, the electronic device may be located in at least one of a plurality of network devices in a computer network.

In an embodiment, the processor may be configured to perform the following steps by executing the computer-readable instructions: obtaining a first resolution used for encoding a to-be-encoded block in a to-be-encoded video frame and a second resolution used for encoding a reference block, the reference block being a reference block to which the to-be-encoded block refers in an encoded video frame; adjusting resolutions of the to-be-encoded block and the reference block to a target resolution in a case that the first resolution is different from the second resolution; and determining an MV of the to-be-encoded block relative to the reference block according to the to-be-encoded block with the target resolution and the reference block with the target resolution.

A person of ordinary skill in the art may understand that, the structure shown in FIG. 9 is only exemplary. The electronic device may be a terminal device such as a smartphone (e.g., an Android mobile phone or an iOS mobile phone), a tablet computer, a palmtop computer, an MID, or a PAD. FIG. 9 does not constitute a limitation on a structure of the electronic device. For example, the electronic device may further include more or fewer components (e.g., a network interface) than those shown in FIG. 9, or have configuration different from that shown in FIG. 9.

The memory 902 may be configured to store computer-readable instructions and modules, for example, computer-readable instructions/modules corresponding to the video encoding method and apparatus in the embodiments of this disclosure, and the processor 904 performs various functional applications and data processing by running the computer-readable instructions and modules stored in the memory 902, that is, implementing the foregoing video encoding method. The memory 902 may include a non-transitory computer-readable storage medium such as a high-speed random access memory, and may also include a non-volatile memory, for example, one or more magnetic storage apparatuses, a flash memory, or another non-volatile solid-state memory. In some embodiments, the memory 902 may further include memories remotely disposed relative to the processor 904, and the remote memories may be connected to a terminal through a network. Examples of the network include, but are not limited to, the Internet, an intranet, a local area network, a mobile communication network, and a combination thereof. The memory 902 may be specifically configured to, but is not limited to, information such as a to-be-encoded block. As an example, as shown in FIG. 9, the memory 902 may include, but is not limited to, the first obtaining unit 702, the first adjusting unit 704, and the first determining unit 706 in the foregoing video encoding apparatus. In addition, the memory may further include, but is not limited to, other modules and units in the foregoing video encoding apparatus. Details are not described in this example again.

In an embodiment, the transmission apparatus 906 is configured to receive or transmit data through a network. Specific examples of the foregoing network may include a wired network and a wireless network. In an example, the transmission apparatus 906 includes an NIC. The NIC may be connected to another network device and a router by using a network cable, so as to communicate with the Internet or a local area network. In an example, the transmission apparatus 906 is an RF module, which communicates with the Internet in a wireless manner.

In addition, the electronic device further includes: a display 908, configured to display a video before being encoded; and a connection bus 910, configured to connect various module components in the electronic device.

An embodiment of this disclosure further provides a storage medium (e.g., a non-transitory computer-readable storage medium), storing computer-readable instructions, the computer-readable instructions being used for performing steps in any one of the foregoing method embodiments when being run.

In an embodiment, the storage medium may be configured to store computer-readable instructions configured to perform the following steps: obtaining a first resolution used for decoding a to-be-decoded block in a to-be-decoded video frame and a second resolution used for decoding a reference block, the reference block being a reference block to which the to-be-decoded block refers in a decoded video frame; adjusting resolutions of the to-be-decoded block and the reference block to a target resolution in a case that the first resolution is different from the second resolution; and determining an MV of the to-be-decoded block relative to the reference block according to the to-be-decoded block with the target resolution and the reference block with the target resolution.

The storage medium is further configured to store computer-readable instructions configured to perform the following steps: obtaining a first resolution used for encoding a to-be-encoded block in a to-be-encoded video frame and a second resolution used for encoding a reference block, the reference block being a reference block to which the to-be-encoded block refers in an encoded video frame; adjusting resolutions of the to-be-encoded block and the reference block to a target resolution in a case that the first resolution is different from the second resolution; and determining an MV of the to-be-encoded block relative to the reference block according to the to-be-encoded block with the target resolution and the reference block with the target resolution.

The storage medium is further configured to store computer-readable instructions configured to perform the steps included in the methods according to the foregoing embodiments, and details are not described again in this embodiment.

In an embodiment, a person of ordinary skill in the art can understand that all or some of the steps of the methods in the foregoing embodiments can be implemented by computer-readable instructions instructing relevant hardware such as a processor or other processing circuitry of a terminal device. The computer-readable instructions may be stored in a computer-readable storage medium, and the storage medium may include a flash drive, a ROM, a RAM, a magnetic disk, a compact disc, and the like.

The sequence numbers of the foregoing embodiments of this disclosure are merely for description purposes and do not imply any preference among the embodiments.

When the integrated unit in the foregoing embodiments is implemented in a form of a software functional unit and sold or used as an independent product, the integrated unit may be stored in the foregoing computer-readable storage medium. Based on such an understanding, technical solutions of this disclosure may be implemented in a form of a software product. The computer software product is stored in a storage medium and includes several computer-readable instructions for instructing one or more computer devices (which may be a personal computer, a server, a network device, and the like) to perform all or some of the steps of the methods described in the embodiments of this disclosure.

In the foregoing embodiments of this disclosure, descriptions of the embodiments have respective focuses. As for parts that are not described in detail in one embodiment, reference may be made to the relevant descriptions of the other embodiments.

In the several embodiments provided in this disclosure, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this disclosure. A person of ordinary skill in the art may further make several improvements and modifications without departing from the principle of this disclosure, and the improvements and modifications are also considered as falling within the protection scope of this disclosure.

What is claimed is:

1. A video decoding method, the method comprising:
obtaining a first resolution of a to-be-decoded block in a to-be-decoded video frame and a second resolution of a reference block referenced by the to-be-decoded block in a decoded video frame;
when the first resolution is different from the second resolution,
adjusting the first resolution of the to-be-decoded block to a target resolution for block resolution matching, and
adjusting the second resolution of the reference block to the target resolution for the block resolution matching, the target resolution being different from the first resolution and the second resolution and being used to perform the block resolution matching for motion vector determination;
determining, by processing circuitry, a motion vector (MV) of the to-be-decoded block in the first resolution relative to the reference block in the second resolution according to the block resolution matching between the adjusted to-be-decoded block with the target resolution and the adjusted reference block with the target resolution; and reconstructing the to-be-decoded block in the first resolution based on the MV determined according to the target resolution.

2. The method according to claim 1, further comprising:
obtaining a syntax element corresponding to the to-be-decoded block, the syntax element indicating the target resolution.

3. The method according to claim 1, wherein the target resolution is an original resolution of the to-be-decoded block or a highest resolution in a predetermined set of resolutions.

4. The method according to claim 1, wherein when the target resolution is lower than a highest resolution in a predetermined set of resolutions,
the adjusting the first resolution of the to-be-decoded block includes:
upsampling the first resolution of the to-be-decoded block to the highest resolution, and
downsampling a resolution of the upsampled to-be-decoded block from the highest resolution to the target resolution, to obtain the to-be-decoded block with the target resolution; and
the adjusting the second resolution of the reference block includes:
upsampling the second resolution of the reference block to the highest resolution, and
downsampling a resolution of the upsampled reference block from the highest resolution to the target resolution, to obtain the reference block with the target resolution.

5. A video encoding method, the method comprising:
obtaining a first resolution of a to-be-encoded block in a to-be-encoded video frame and a second resolution of a reference block referenced by the to-be-encoded block in an encoded video frame;
when the first resolution is different from the second resolution,
adjusting the first resolution of the to-be-encoded block to a target resolution for block resolution matching, and
adjusting the second resolution of the reference block to the target resolution for the block resolution matching, the target resolution being different from the first resolution and the second resolution and being used to perform the block resolution matching for motion vector determination;
determining, by processing circuitry, a motion vector (MV) of the to-be-encoded block in the first resolution relative to the reference block in the second resolution according to the block resolution matching between the adjusted to-be-encoded block with the target resolution and the adjusted reference block with the target resolution; and
encoding the to-be-encoded block in the first resolution based on the MV determined according to the target resolution.

6. The method according to claim 5, further comprising:
obtaining a syntax element corresponding to the to-be-encoded block, the syntax element indicating the target resolution.

7. The method according to claim 5, wherein the target resolution is an original resolution of the to-be-encoded block or a highest resolution in a predetermined set of resolutions.

8. The method according to claim 5, wherein when the target resolution is lower than a highest resolution in a predetermined set of resolutions,
the adjusting the first resolution of the to-be-encoded block includes:
upsampling the first resolution of the to-be-encoded block to the highest resolution, and
downsampling a resolution of the upsampled to-be-encoded block from the highest resolution to the target resolution, to obtain the to-be-encoded block with the target resolution; and
the adjusting the second resolution of the reference block includes:
upsampling the second resolution of the reference block to the highest resolution, and
downsampling a resolution of the upsampled reference block from the highest resolution to the target resolution, to obtain the reference block with the target resolution.

9. A video processing apparatus, comprising:
processing circuitry configured to:
obtain a first resolution of a to-be-processed block in a to-be-processed video frame and a second resolution of a reference block referenced by the to-be-processed block in a processed video frame;
when the first resolution is different from the second resolution,
adjust the first resolution of the to-be-processed block to a target resolution for block resolution matching, and
adjust the second resolution of the reference block to the target resolution for the block resolution matching, the target resolution being different from the first resolution and the second resolution and being used to perform the block resolution matching for motion vector determination;
determine a motion vector (MV) of the to-be-processed block in the first resolution relative to the reference block in the second resolution according to the block resolution matching between the adjusted to-be-processed block with the target resolution and the adjusted reference block with the target resolution; and
process the to-be-processed block in the first resolution based on the MV determined according to the target resolution.

10. The apparatus according to claim 9, wherein the processing circuitry is further configured to:
obtain a syntax element corresponding to the to-be-processed block, the syntax element indicating the target resolution.

11. The apparatus according to claim 9, wherein the to-be-processed block is a block that is to be decoded or encoded.

12. A non-transitory computer-readable storage medium storing instructions which when executed by one or more processors cause the one or more processors to perform the video decoding method according to claim 1.

13. A non-transitory computer-readable storage medium storing instructions which when executed by one or more processors cause the one or more processors to perform the video encoding method according to claim 5.

14. The video processing apparatus according to claim 9, wherein the target resolution is an original resolution of the to-be-processed block or a highest resolution in a predetermined set of resolutions.

15. The video processing apparatus according to claim 9, wherein when the target resolution is lower than a highest resolution in a predetermined set of resolutions, the processing circuitry is configured to:

upsample the first resolution of the to-be-processed block to the highest resolution;
downsample a resolution of the upsampled to-be-processed block from the highest resolution to the target resolution, to obtain the to-be-processed block with the target resolution;
upsample the second resolution of the reference block to the highest resolution; and
downsample a resolution of the upsampled reference block from the highest resolution to the target resolution, to obtain the reference block with the target resolution.

* * * * *